United States Patent [19]

Stern

[11] B 3,990,292

[45] Nov. 9, 1976

[54] FREQUENCY MODULATED FLUIDIC GAUGE

[75] Inventor: Hansjoerg Stern, Scotia, N.Y.

[73] Assignee: General Electric Company, New York, N.Y.

[22] Filed: Dec. 13, 1974

[21] Appl. No.: 532,319

[44] Published under the second Trial Voluntary Protest Program on February 3, 1976 as document No. B 532,319.

[52] U.S. Cl. ................................. 73/37.7; 73/160
[51] Int. Cl.² ............................... G01B 13/02
[58] Field of Search ............ 73/37.7, 37.6, 37.5, 73/160, 159, 37; 137/803, 804, 825, 833

[56] References Cited
UNITED STATES PATENTS

| 3,271,997 | 9/1966 | Horne et al. | 73/37.7 |
| 3,282,085 | 11/1966 | Benson et al. | 73/37.7 |
| 3,728,894 | 4/1973 | Stern | 73/37.5 |
| 3,768,303 | 10/1973 | Rauch | 73/37.7 |

FOREIGN PATENTS OR APPLICATIONS

| 1,912,329 | 3/1969 | Germany | 73/37.7 |

*Primary Examiner*—Richard C. Queisser
*Assistant Examiner*—Joseph W. Roskos
*Attorney, Agent, or Firm*—Stephen A. Young; Walter C. Bernkopf; Robert A. Cahill

[57] ABSTRACT

A frequency modulated fluidic gauge having no moving parts for monitoring a characteristic of a continuously moving strand-like material. The gauge is comprised of a fluidic oscillator circuit including a fluidic amplifier, and a fluidic phase shifting network for fluidically coupling an output fluidic signal from an amplifier output port to an amplifier control input port at a phase angle that insures oscillation of an output signal from the amplifier output port at a predetermined frequency which is proportional to the characteristic of the material being monitored. The phase shifting network is comprised of a fluidic capacitor, an enclosed gauging channel for receiving the strand-like material passing therethrough, means for fluidically coupling the output signal from the amplifier output port to the gauging channel, and means for fluidically coupling at least a portion of the output signal to the fluidic capacitor and the amplifier control port. A part of the gauging channel, which receives that portion of the output signal passing between the walls of the gauging channel and the continuously moving strand-like material, defines a variable fluidic resistor, whereby the frequency of the oscillator output signal varies inversely as the product of the variable resistor and the fluidic capacitor.

8 Claims, 6 Drawing Figures

FREQUENCY MODULATED FLUIDIC GAUGE

BACKGROUND OF THE INVENTION

1. Field of the Invention

This invention relates to a fluidic gauge, and, more particularly, to a frequency modulated fluidic gauge having no moving parts for monitoring a characteristic of a continuously moving strand-like material.

2. Description of the Prior Art

Prior art fluidic gauges for monitoring a characteristic of a continuously moving strand-like material generate a pneumatic output pressure signal which is proportional to a characteristic of the material. However, as the diameter of the material is decreased, the dimension of an enclosed channel of a suitable sensor head, which can be used to monitor the desired characteristic, also must be decreased accordingly, thereby resulting in a significant increase in the fluidic resistance of the channel. The time constant of the gauge includes the fluidic resistance of the channel multiplied by the line capacitance between the channel and a pressure responsive transducer. Thus, for material diameter and/or denier measurements of approximately 0.006 inch to approximately 0.008 inch within about a 0.010 inch diameter channel, the time constant of the readout circuit could conceivably rise to approximately one or two seconds. Under these circumstances, if the strand-like material were moving through the gauging channel at a speed of 3,000 feet per minute, and if the circuit response time is approximately two seconds, one hundred feet of bad material could pass through the gauge before a suitable response could be made to a machine. This, of course, can lead to an accumulation of a large and expensive amount of waste, which could render the pneumatic sensing gauge inappropriate for use.

Thus, as seen above, fluidic gauges which provide a pressure sensitive readout for monitoring a characteristic of strand-like material are generally unsuitable for monitoring strand-like material having a diameter less then approximately 0.008 inch. Furthermore, if the gauge is located a significant distance away from a pressure transducer, the line capacitance will be quite large, and the circuit time constant may be too large for useful operation even when more moderately dimensioned strand-like material is being measured.

OBJECTS OF THE INVENTION

It is therefore an object of this invention to provide an improved fluidic gauge for monitoring a characteristic of strand-like material which is suitable for monitoring small diameter or denier material.

It is another object of this invention to provide for an improved fluidic gauge, for monitoring a characteristic of strand-like material, having an improved response time as compared with prior art pneumatic pressure readout type fluidic gauges.

It is another object of this invention to provide an improved fluidic gauge wherein the response time of the gauge is relatively independent of the distance between a gauging channel and a transducer.

Other objects of the invention will be pointed out hereinafter.

SUMMARY OF THE INVENTION

According to a braod aspect of the invention there is provided a frequency modulated fluidic gauge having no moving parts for monitoring a characteristic of a continuously moving strand-like material. The gauge is comprised of a fluidic oscillator circuit including a fluidic amplifier, and a fluidic phase shifting network for fluidically coupling an output fluidic signal from an amplifier output port to an amplifier control input port at a phase angle that insures oscillation of the output signal from the amplifier output port at a predetermined frequency which is proportional to the characteristic of the material being monitored. The phase shifting network is comprised of a fluidic capacitor, an enclosed gauging channel for receiving the strand-like material passing therethrough, means for fluidically coupling the output signal from the amplifier output port to the gauging channel, and means for fluidically coupling at least a portion of the output signal flowing into the gauging channel to the fluidic capacitor and the amplifier control port. A part of the gauging channel, which receives the portion of the output signal passing between the walls of the gauging channel and the continuously moving strand-like material, defines a variable fluidic resistor, whereby the frequency of the output signal from the oscillator varies inversely as the product of the variable resistor and the fluidic capacitor.

The fluidic gauge can be further comprised of a second oscillator circuit having an output signal at approximately the same temperature as the temperature of, and at a frequency different from, the frequency of the output signal from the first oscillator. The fluidic gauge can additionally be comprised of means for summing the output signals from the first and second oscillator circuits and means for rectifying the summed signals to generate an output beat signal having a frequency equal to the difference between the frequencies of the output signals of the first and second oscillator circuits, whereby the frequency of the output beat signal is substantially independent of the temperature variation of the fluid flowing through the first and second oscillator circuits.

DESCRIPTION OF THE PREFERRED EMBODIMENTS

One embodiment of the invention will now be explained with reference to FIGS. 1 through 3.

Figure 1:
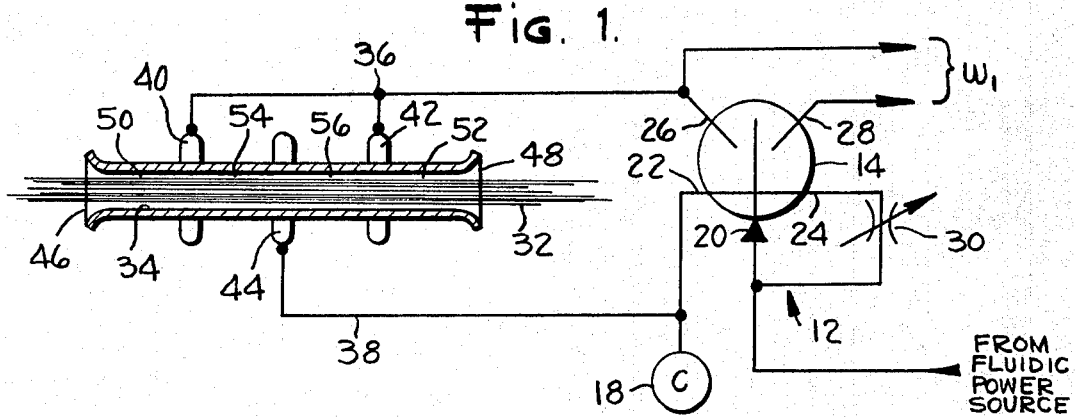
FIG. 1 shows a fluidic oscillator circuit which comprises one embodiment of a fluidic gauge in accordance with this invention.
Figure 2:
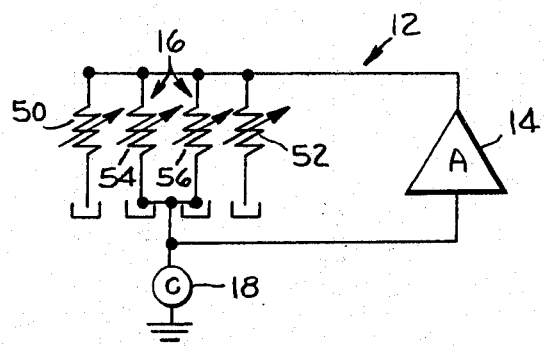
FIG. 2 is an electrical equivalent circuit of the fluidic oscillator circuit shown in FIG. 1.
Figure 3:
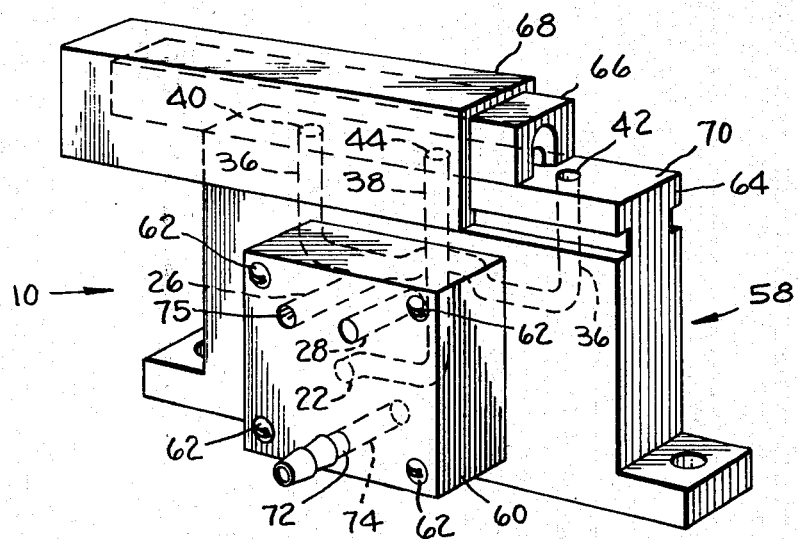
FIG. 3 shows an isometric structural representation of a fluidic gauge which is comprised of the fluidic circuit shown in FIG. 1.

A frequency modulated fluidic gauge 10, shown in FIG. 3, is comprised of a fluidic oscillator circuit 12 shown in FIGS. 1 and 2. Oscillator circuit 12 is further comprised of a fluidic amplifier 14 and a fluidic phase shifting network which comprises a variable fluidic resistor 16 (shown in FIG. 2) and a fluidic capacitor 18.

Amplifier 14 is a standard fluidic amplifier, comprised of a plurality of laminated sheets of the type described in U.S. Pat. No. 3,534,755, entitled "High Signal to Noise Fluidic Amplifier and Fluidic Components", inventor T. F. Urbanosky, and assigned to the same assignee as the assignee of the present invention, and has a power input port 20, first and second control input ports 22 and 24 and first and second output ports 26 and 28. Input port 20 is fluidically coupled to a fluidic power source (not shown) which is external to gauge 10 for receiving power in the form of pressurized air. The power source is also fluidically coupled to control input port 24 via a variable fluidic resistor 30 to establish a biasing level for the amplifier.

The phase shifting network fluidically couples an output fluidic signal from amplifier output port 26 back to amplifier control port 22 at a phase angle that insures oscillation of the output signal from the amplifier output port at a predetermined frequency which is proportional to a characteristic of a continuously moving strand-like material 32 being monitored. Variable resistor 16 is comprised of at least a part of an enclosed gauging channel 34 for receiving the continuously moving strand-like material 32 passing therethrough. A first passageway means 36 is provided for fluidically coupling the output signal from amplifier output port 26 to gauging channel 34. A second passageway means 38 is provided for fluidically coupling at least a portion of the output signal, flowing into the gauging channel, to fluidic capacitor 18 and amplifier control port 22. Gauging channel 34 has first and second channel ports 40 and 42 (shown in FIGS. 1 and 3) fluidically coupled to first passageway means 36 for receiving the output fluidic signal from amplifier 14. Furthermore, gauging channel 34 has a third channel port 44 fluidically coupled to second passageway means 38 and positioned between the first and second channel ports. As the output fluidic signal flows into gauging channel 34 via first and second channel port 40 and 42, a portion of the signal flows between the walls of the gauging channel and the strand-like material and out of respective ends 46 and 48 of the gauging channel to define a respective first and second variable resistor sections 50 and 52, and the remaining portions of the output fluidic signal flows from respective first and second channel ports 40 and 42 between the enclosed walls of the channel and the strand-like material and out through third channel port 44 to define a respective third and fourth variable fluidic resistor sections 54 and 56. As shown in FIG. 3, variable fluidic resistor sections 50 and 52 are vented to the atmosphere, while variable fluidic resistor sections 54 and 56 are fluidically connected in parallel to define variable fluidic resistor 16, which also is the effective resistance of the phase shifting network for the purpose of determining the oscillating frequency of the output fluidic signal. Resistor sections 50, 52, 54 and 56 can be designed to have approximately the same fluidic resistance, although the resistance of these sections need not be made equal to each other. Capacitor 18 can be equal to the line capacitance of second passageway means 38. However, if it is necessary that additional capacitance be provided in order to insure proper oscillation of the amplifier at a desired frequency, additional capacitance can be provided by fluidically coupling a capacitor volume to passageway means 38. The capacitor volume can be formed within a plate of the type described in U.S. Pat. application No. 513,841, entitled "A Torsional Reed Reference Fluidic Oscillator", inventors T. S. Honda and C. G. Ringwall, filed Oct. 10, 1974, and assigned to the same assignee as the assignee of the present invention.

Fluidic gauge 10 is structurally shown in FIG. 3 as being comprised of a fluidic sensor head 58, which is a modification of the sensor head described in U.S. Pat. No. 3,768,303 entitled "Miniature Yarn Air Gauge Head", inventor William Rauch, and assigned to the same assignee as the assignee of the present invention, and a fluidic circuit housing section 60, which is fastened to the sensor head using standard bolts 62. Sensor head 58 is comprised of a base 64, a gauge plate 66 and a U-shaped cover plate 68. Base 64 has a top surface 70 which is in mating engagement with gauge plate 66. Plate 66 has an elongated slot therethrough which forms enclosed gauging channel 34, shown in FIG. 1, for receiving strand-like material 32. U-shaped cover plate 68 slidingly engages base 64 for maintaining engagement between gauge plate 66 and surface 70 of base 64. The assembly detail regarding these components is more fully described in the above referred to U.S. Pat. No. 3,768,303. Fluidic housing section 60 can contain fluidic resistor 30, a laminated structure comprising amplifier 14, and, if necessary, a fluidic capacitor volume. The fluidic sensor head described in U.S. Pat. No. 3,768,303 is shown in FIG. 3 to be modified by the enclosed gauging channel having channel ports 40, 44 and 42, a passageway means 36 for fluidically coupling amplifier output port 26 to first and second channel ports 40 and 42, and passageway means 38 for fluidically coupling channel port 44 to control input port 22. Fluidic housing section 60 is provided with an input port 72 and a passageway 74 for fluidically coupling the input fluidic power to fluidic resistor 30 and power nozzle 20 of amplifier 14. Section 60 also has an output port 75 fluidically coupled to amplifier output port 26.

Strand-like material 32 may be in the form of a monofilament of a multifilament strand of yarn, wire or tubing, etc. The characteristic of material 32 being monitored may be its diameter, denier, sliver weight, density, porosity, etc. Sensor head 58 and fluidic circuit housing section 60 can be comprised of any suitable structural material, such as anodized aluminum, hardened tool steel, etc.

The operation of the frequency modulated fluidic gauge will now be explained. As stated above, fluidic power is supplied to power nozzle 20 of amplifier 14 from a fluidic power source (not shown). At the same time, fluidic power is applied to control port 24 via fluidic resistor 30 to set the biasing level for the amplifier. An output fluidic signal is generated from amplifier output port 26 and is fluidically coupled to gauging channel 34, and a portion of the output fluidic signal received within gauging channel 34 is fluidically coupled via channel port 44 and passageway means 38 back to control input port 22. The parallel combination of variable fluidic resistor sections 54 and 56, which comprises variable fluidic resistor 16 provided by the phase-shifting network, in combination with capacitor 18, which is determined by the line capacitance of passageway means 38, and, if necessary, an additional capacitor volume, provide the proper phase shift to insure that the output signal at amplifier output port 26 oscillates at a frequency which is inversely proportional to the product of the component values of variable fluidic resistor 16 and fluidic capacitor 18. Since the fluidic resistance of the sections 54 and 56 varies directly with an increase in size, density, porosity, sliver weight, etc. of the strand-like material passing through the gauging channel, the frequency of the output fluidic signal of the oscillator is inversely proportional to variations in the characteristic of the strand-like material.

Thus, if the fluidic gauge is designed to have a specified output frequency for a given characteristic of the strand-like material passing through the gauging channel, any variation in the material will produce a corresponding variation in the frequency ($\omega_1$) of the output signal. In this manner variations in the characteristic of the strand-like material being monitored causes a modulation of the frequency of the output signal from the gauge, and upon demodulation of this output signal, the characteristic of the material can be accurately monitored. Inasmuch as the fluidic signal flowing through the phase shifting network is travelling approximately at the speed of sound when the frequency of the oscillator is in the sonic range, the output signal will be independent of the time constant of the circuit, the dimensions of the gauging channel and the strand-like material, and the distance between the fluidic gauge and a control circuit for correcting a machine operation.

At this point it should be noted that the output signal which is taken from amplifier output port 26, or between output ports 26 and 28, can be applied to an acoustic to electric transducer, such as a microphone, to convert the fluidic signal to an electrical signal which can then be demodulated and applied to a control circuit for correcting the operation of a machine. Alternatively, this output signal can be applied to a fluidic frequency-to-analog converter of the type described in U.S. Pat. No. 3,458,129 entitled "Fluidic Frequency-to-Analog Circuit", inventor C. W. Woodson and assigned to the same assignee as the assignee of the present invention, wherein the resultant analog signal is then applied to a pressure transducer for correcting the operation of the machine.

Figure 5:
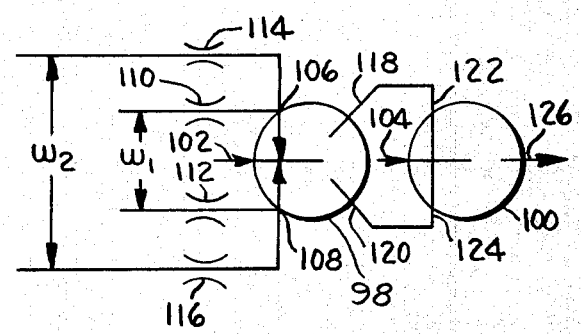
FIG. 5 shows a fluidic circuit for summing the output oscillator signals from the fluidic circuit shown in FIG. 4, and for rectifying the summed signals to provide an output beat signal at the difference frequency of the frequencies of the summed signals.
Figure 6:
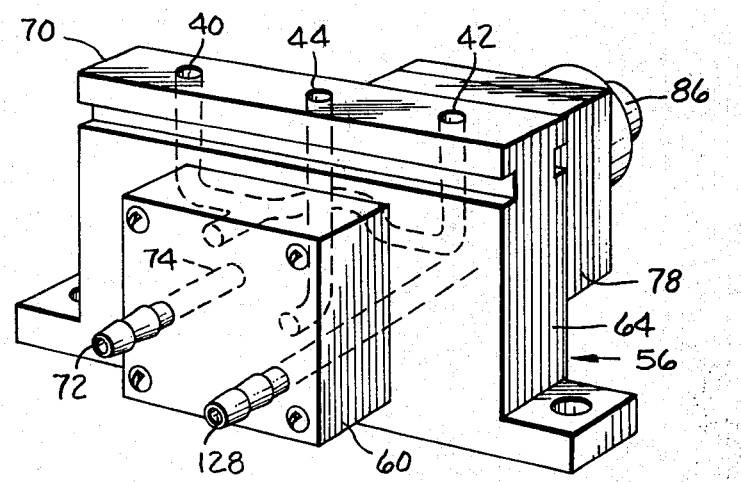
FIG. 6 is an isometric structural representation of the fluidic gauge which is comprised of the circuits shown in FIGS. 4 and 5, wherein the slide-on top and gauge plate of the gauge shown in FIG. 3 have been omitted for the sake of clarity.
Figure 4:
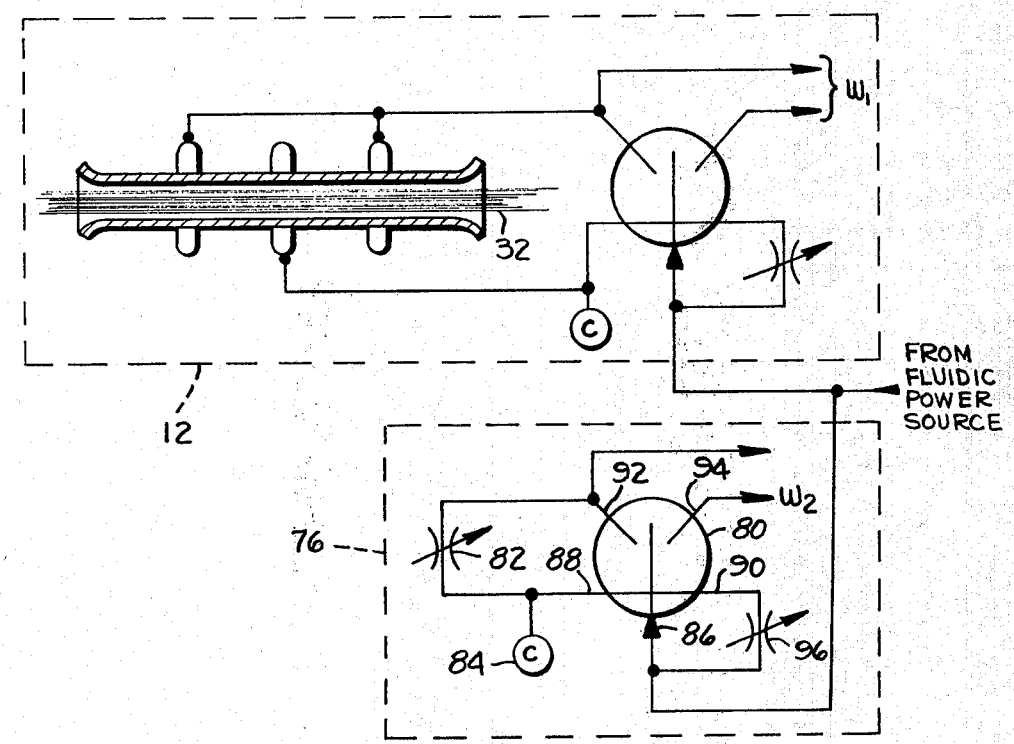
FIG. 4 is a fluidic circuit representation of a second embodiment of the invention showing an additional oscillator circuit in combination with the oscillator circuit shown in FIG. 1 for providing temperature compensation for the fluidic gauge.

Inasmuch as the product of the variable resistance and capacitance of the fluidic phase shifting network is a function of the square root of the absolute temperature of the fluid flowing through the phase shifting network, the frequency of the output signal from oscillator circuit 12 can vary with temperature, if there is a significant variation in temperature of the fluid flowing through the fluidic gauge during a monitoring operation. Therefore, in order to avoid errors resulting from operation of the fluidic gauge over a wide temperature range, the fluidic gauge shown in FIGS. 1 through 3 can be modified in the following manner to provide for adequate temperature compensation. As shown in FIGS. 4 through 6, oscillator circuit 12 is supplemented by a second oscillator circuit 76, which is mounted within a second fluidic circuit housing section 78, and section 78 is mounted to the far side of gauge base 64, as shown in FIG. 6. Referring to FIG. 4, second oscillator circuit 76 is comprised of a fluidic amplifier 80 and a phase shifting network comprised of a variable fluidic resistor 82 and a fluidic capacitor 84. The component values of resistor 82 and capacitor 84 are sufficient to insure oscillation of oscillator 76 at a desired frequency ($\omega_2$) wherein the output frequency ($\omega_1$) of oscillator 12 will generally range from 1 to 10 percent more or less than that of ($\omega_2$). The actual frequency ($\omega_2$) of the second oscillator can be adjusted physically by moving a nob 86 attached to fluidic circuit housing section 78, shown in FIG. 6, to vary the component value of fluidic resistor 82. Amplifier 80 is comprised of a power nozzle port 86, first and second control input ports 88 and 90, and first and second output ports 92 and 94. In this instance, the fluidic power supplied to power nozzle 86 and control input port 90 via a variable fluidic resistor 96, which resistor is again used to set the biasing level for the amplifier, is supplied from the same fluidic power source which is feeding the power nozzle of the amplifier of oscillator 12. Since both oscillator circuits are mounted in close proximity to one another, and since the fluid flowing through both circuits originates from the same power source, the fluid in the second oscillator circuit is at approximately the same temperature as the temperature of the fluid in the first oscillator circuit. This insures that $\omega_1$ and $\omega_2$ will vary approximately in proportion to the temperature of the fluid flowing through the oscillator circuits.

In this instance, fluidic section 60 can contain an additional fluidic circuit (shown in FIG. 5) comprised of a fluidic summing amplifier 98 and a fluidic rectifier 100. Amplifier 98 and rectifier 100 have respective input power nozzles 102 and 104 which are fluidically connected to the same fluidic power source as the amplifier power nozzles of the oscillator circuits. Meanwhile, the output fluidic signal from first oscillator 12 is applied across a pair of input control ports 106 and 108 of summing amplifier 98 via respective fluidic resistors 110 and 112, and the output fluidic signal from second oscillator circuit 76 is also applied across control input ports 106 and 108 of the summing amplifier via respective fluidic resistors 114 and 116. The summed signal from amplifier 98 is fluidically coupled from a pair of output ports 118 and 120 of the summing amplifier to a respective pair of control input ports 122 and 124 of rectifier 100. An output beat signal received at an output port 126 of rectifier 100 has one frequency component equal to $\omega_2$ minus $\omega_1$, whereby the frequency of the output beat signal is substantially independent of temperature variations in the output fluidic signals from the first and second oscillators. This output beat signal can be fluidically coupled from an output port 128 in fluidic circuit housing section 60 (shown in FIG. 6) to a processing network that is similar to that described with reference to the embodiment shown in FIGS. 1 through 3 to control the operation of a machine for adjusting the characteristic of the strand-like material being monitored. Thus, the gauge shown in FIG. 6 (gauge plate 66 and cover plate 68 being omitted for the sake of clarity) is suitable for monitoring a characteristic of continuously moving strand-like material over wide variations in operating temperatures of the fluidic signals passing through and extracted from the fluidic gauge.

Although the invention has been described with reference to specific embodiments thereof, numerous modifications are possible without departing from the invention, and it is desirable to cover all modifications falling within the spirit and scope of this invention.

What I claim as new and desire to secure by Letters Patent of the United States is:

1. A fluidic gauge having no moving parts for monitoring a characteristic of a continuously moving strand-like material, comprising:
    a. At least a first fluidic amplifier having a power input port for receiving fluidic power, at least one control input port and at least one output port; and
    b. a fluidic phase shifting network for fluidically coupling an output fluidic signal from said amplifier output port back to said amplifier control input port at a phase angle that insures oscillation of the output signal from said amplifier output port at a predetermined frequency proportional to the characteristic of the material being monitored, said phase shifting network comprising:
        1. a fluidic capacitor;
        2. an enclosed gauging channel for receiving the strand-like material passing therethrough;
        3. a first passageway means for fluidically coupling the output signal from said amplifier output port to said gauging channel;
        4. a second passageway means for fluidically coupling at least a portion of said output signal, flowing into said gauging channel, to said fluidic capacitor and said amplifier control input port, a part of said gauging channel which receives said portion of said output signal passing between the walls of said gauging channel and the continuously moving strand-like material defines a variable fluidic resistor, whereby the combination of said amplifier and said phase shifting network comprises a first fluidic oscillator circuit having an output signal frequency which varies inversely as the product of said variable resistor and said fluidic capacitor.

2. A fluidic gauge according to claim 1, wherein said amplifier has a second control input port, and said gauge further comprises an adjustable fluidic resistor fluidically coupled between said power input port and said second amplifier control input port to establish a biasing level for said amplifier.

3. A fluidic gauge according to claim 1, wherein said gauging channel has first and second channel ports fluidically coupled to said first passageway means for receiving said output fluidic signal from said first passageway means.

4. A fluidic gauge according to claim 3, wherein said gauging channel has a third channel port fluidically coupled to said second passageway means and positioned between said first and second channel ports to define a first variable fluidic resistor section between one end of said channel and said first channel port, a second variable fluidic resistor section between said second channel port and another end of said channel, a third variable fluidic resistor section between said first and third channel ports, and a fourth variable fluidic resistor section between said third and second channel ports.

5. A fluidic gauge according to claim 4, wherein said third and fourth variable fluidic resistor sections are fluidically connected in parallel to define said variable fluidic resistor.

6. A fluidic gauge according to claim 4, wherein the fluidic resistance of each of said first, second, third, and fourth fluidic sections is equal to each other.

7. A fluidic gauge according to claim 1, further comprising a second oscillator circuit having an output signal at a frequency different from the frequency of the output signal from said first oscillator circuit, and the temperature of the fluid flowing through said first oscillator circuit is at approximately the same temperature as the fluid flowing through said second oscillator circuit.

8. A fluidic gauge according to claim 7, further comprising:
    a. means for summing the output signals from said first and second oscillator circuits; and
    b. means for rectifying the summed signals to generate an output beat signal having a frequency equal to the difference between the frequencies of the output signals of said first and second oscillator circuits, whereby the frequency of the output beat signal is substantially independent of the temperature variations of the fluid flowing through said first and second oscillator circuits.

* * * * *